United States Patent Office 3,005,320
Patented Oct. 24, 1961

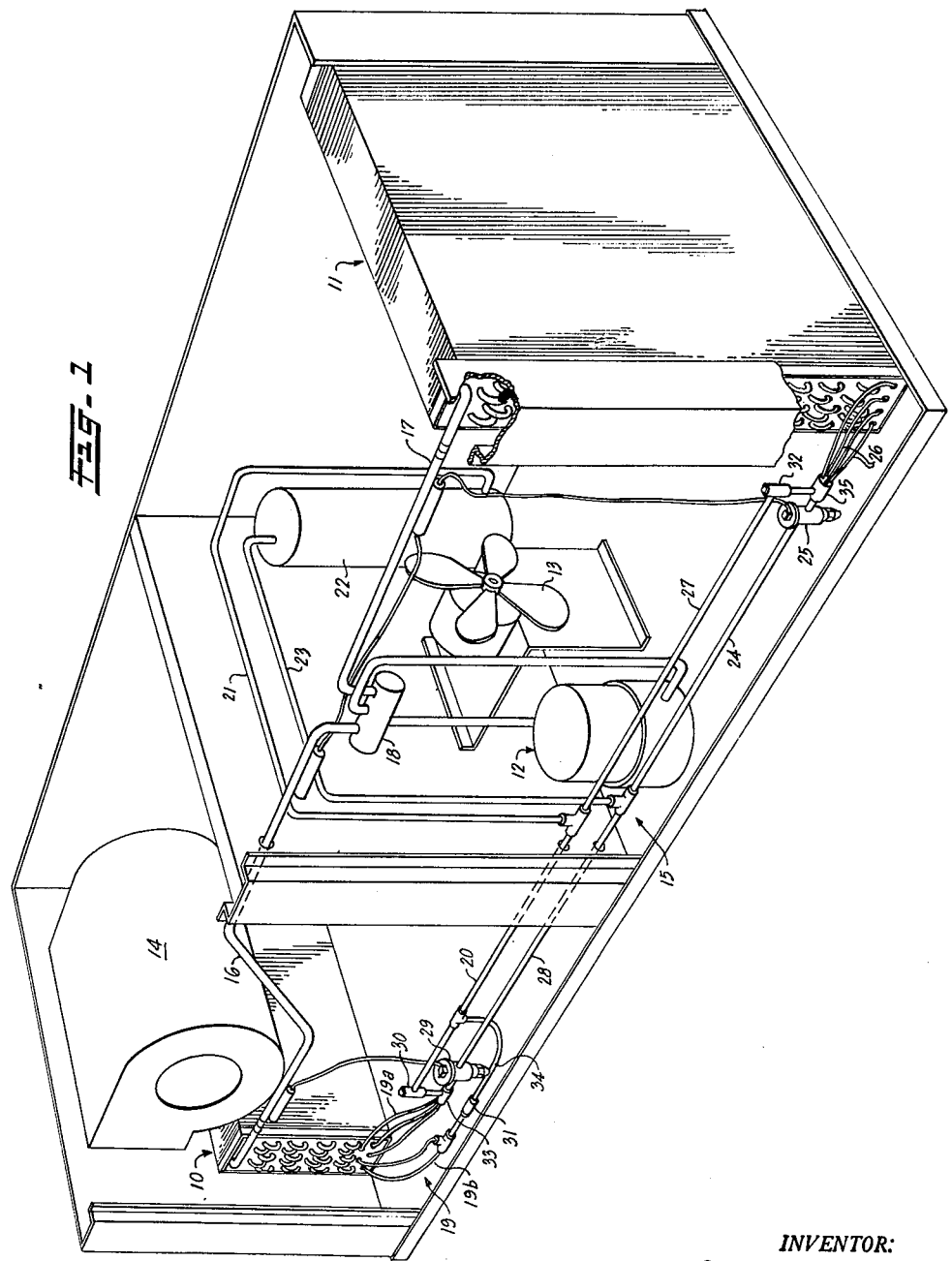

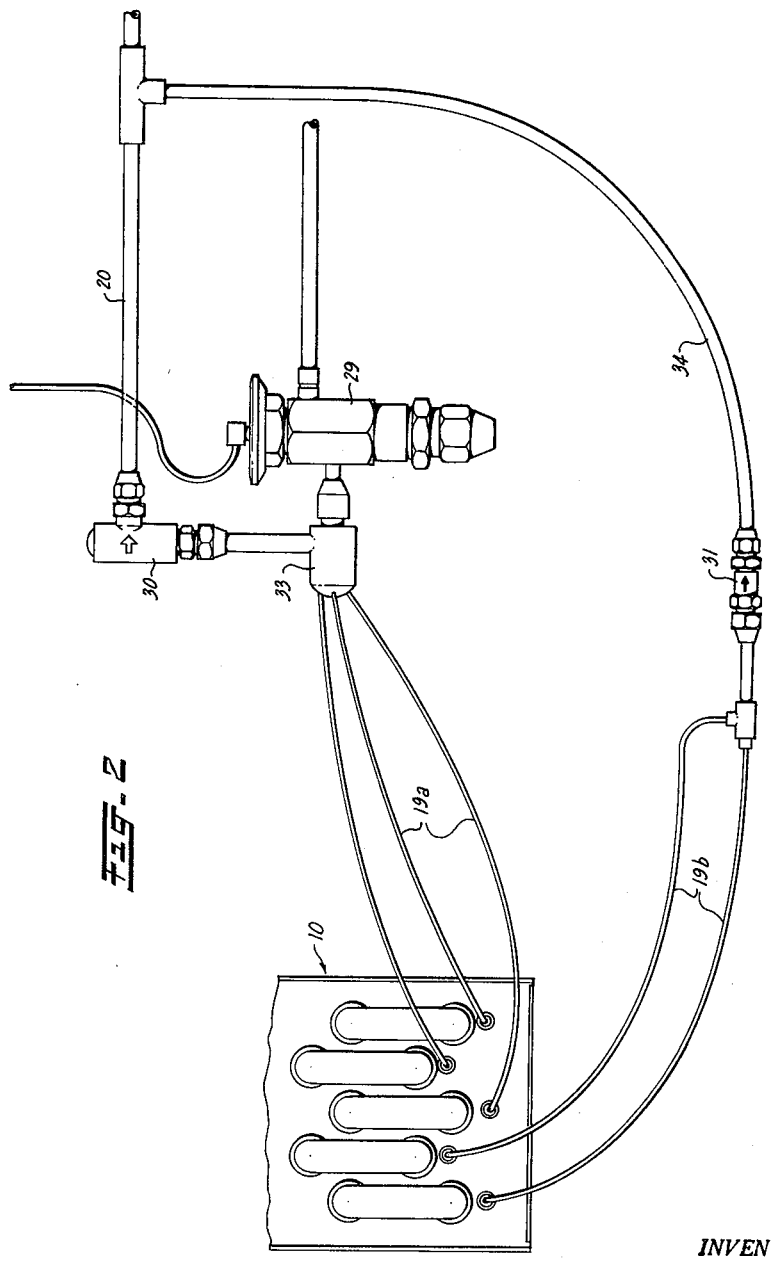

3,005,320
BALANCED REVERSE CYCLE HEATING AND
COOLING SYSTEM
Cornell Bodell, Phoenix, Ariz., assignor to Wright Manufacturing Co., Phoenix, Ariz., a corporation of Arizona
Filed May 2, 1960, Ser. No. 26,298
6 Claims. (Cl. 62—160)

This invention relates to a reverse cycle system for heating and cooling an enclosure, and more particularly involves apparatus for operating a balanced heating and cooling system which is capable of instantaneously changing cycles from heating to cooling or from cooling to heating.

Reverse cycle systems are generally well known in the art of air conditioning. These systems include indoor and outdoor coils which may be selectively and alternatively connected to the discharge end of a compressor, the other one of said coils being used as an evaporator and receiving gases from the compressor-connected coil through an expansion means, such as capillary tubing or an expansion valve. Obviously, the indoor coil is connected to the compressor whenever a heating effect is desired, while a reverse connection is used for refrigeration or cooling.

The problem of operating a reverse cycle system at peak efficiency for both cycles of operation has been well recognized. It is commonly known and understood that during normal use in a summer cooling cycle there is a considerable temperature differential between the indoor coil acting as an evaporator and its ambient atmosphere, but that during use in a winter heating cycle there is much less of a temperature difference between the outdoor coil and its ambient atmosphere. Because the rate at which heat energy is released to or gained from ambient atmosphere is propertional to the temperature difference between a coil and its ambient atmosphere, the indoor coil in a cooling cycle tends to gain more heat energy than the outdoor coil in a heating cycle for any given refrigerant flow rate. But since the efficiency of a system is greatly dependent upon the flow rate, the size of its compressor being selected to produce a flow rate which insures complete evaporation of the refrigerant as it passes through the evaporator coil, only one cycle of a reverse cycle system can be operated at peak efficiency. Moreover, in conventional reverse cycle systems where the indoor heat exchanger surface is the same for both heating and cooling cycles, it is essential that such systems be designed to operate at peak efficiency during the cooling cycle. If these systems were designed to operate at maximum efficiency on the heating cycle, there would be too much heat exchanger surface for reversely operating on a cooling cycle, leading to high back pressures as well as high superheat conditions which directly affect the life of the compressor. However, in conventional designing of a heat pump system on the basis of providing efficiency during the cooling cycle, there is not enough heat exchanger surface area provided for operating efficiently during the heating cycle.

The present invention involves a novel organization of structures wherein the effective amount of surface area of an indoor coil will be automatically decreased when the system is operated on the cooling cycle, thereby providing balanced efficiency in operating on both cycles of operation. Since a given compressor will cycle approximately the same quantity of fluid gas during both winter and summer use, the rate of refrigerant flow through the indoor coil may be controlled by decreasing the number of effective indoor coils when operated in a cooling cycle. When a heating cycle is employed, the number of indoor coils (which then operate as a condenser) are increased, thereby decreasing the rate of flow therethrough and providing a greater opportunity for a heat exchange.

While varying the number of indoor coils has solved the general problem involved in reverse cycle systems, none of the conventional apparatus will permit instantaneous reversal of the cycles. Ordinarily, a complicated system of shut-off valves is employed to redirect the refrigerant flow into fewer (or additional) coils. In view of this fact, it is a primary object of this invention to provide a balanced reverse cycle system which is instantly changed from a heating to a cooling cycle (or vice versa) by simply reversing the pressure-suction connections of the compressor. This latter change may be accomplished by any of the conventional devices now being used, including a solenoid operated, double reversing valve which is temperature controlled.

Another object is to provide a balanced reverse cycle system including an arrangement of one-directional flow lines, whereby the refrigerant flow through the indoor coil is more rapid in the cooling cycle than it is in the heating cycle and whereby the system is capable of being instantly reversed in its operating cycle.

A further object of this invention is to provide a balanced reverse cycle system having the following apparatus in combination: a first bank of indoor coils having first and second leads, said first leads being connected to a first manifold line; a second bank of outdoor coils having third and fourth leads, said third leads being connected to a second manifold line; a compressor having suction and discharge connections; means for selectively connecting said discharge and suction connections to said first and second manifold lines respectively during the heating cycle and to said second and first manifold lines respectively during the cooling cycle; a first fluid transmitting means for collecting gas from said second leads and passing said gas to said fourth leads including first check valve means and means for expanding the gas passing therethrough; and a second fluid transmitting means for collecting gas from said fourth leads and passing said gas to fewer than all of said second leads including a second check valve means and means for expanding the gas passing therethrough.

Other objects of this invention will become apparent in view of the following detailed description taken in conjunction with the drawings.

In the drawings forming a part of this application and in which like reference numerals identify like parts throughout the same:

FIG. 1 is a perspective view of one embodiment for an air conditioning unit having apparatus which is capable of being operated in a reverse cycle system; and FIG. 2 is a detailed view of a connection for the indoor coil being used in the system of FIG. 1.

Referring to FIG. 1 of the drawings, the air conditioning unit illustrated is comprised of an indoor coil 10 having a number of lead connections, an outdoor coil 11 having a number of lead connections, a compressor 12, an air circulating fan 13, a blower 14, and apparatus for interconnecting coils 10 and 11 into a reverse cycle system, said apparatus being generally indicated by reference number 15. As in other systems of this kind, the indoor coil 10 is connected to either the discharge or the suction end of the compressor 12 through a manifold conduit or line 16, while outdoor coil 11 is connected to the opposite end through a manifold conduit or line 17. Both conduits 16 and 17 pass through a conventional double reversing valve 18 that may be temperature controlled and solenoid operated. According, when the temperature of a room is subnormal and a heating cycle is required, valve 18 would occupy a position connecting conduit 16 to the discharge side of compressor 12 while connecting conduit 17 to the suction end. Should the room temperature become abnormally high, then the valve connections would be reversed, placing conduit 16 in connection with the compressor's suction end and conduit 17 with the discharge side.

Obviously, during the cooling cycle, for example, outdoor coil 11 receives compressed gases from compressor 12 through conduit 17. Coil 11 then acts as a condenser giving up heat to its surrounding atmosphere, which is continually stirred up by the fresh air currents developed by fan 13. The cooled, compressed gases leave coil 11 through conduit connections including means for expanding and decompressing the gases. This will result in further cooling of the gases immediately before they are passed into the indoor coil 10, where an endothermic expansion of the gases produces a cooling of the coil and its surrounding atmosphere, and blower 14 takes in the cooled ambient air and disseminates it into a room enclosure. The heating cycle of the system is directly opposite in operation and effect, the only difference being in the rate of refrigerant flow through the indoor coil 10 for the purpose and reasons outlined above.

This invention is more particularly directed to the means by which coils 10 and 11 are interconnected by connections 15 to provide a reverse cycle system that may be instantaneously changed from one cycle to another. The importance of having such a system will be well recognized, especially by persons who live in those areas where extreme temperature changes occur in a single day and where such changes are apt to occur suddenly. With standard systems, it being necessary to operate a complicated arrangement of valve structures to redirect the flow of refrigerant gases, constant attention with attendant manual operation is required to switch over the system from one cycle to another. Even then, many systems are incapable of being operated at a peak efficiency for both the heating and cooling cycles.

In general, the conduit connections 15 provide two distinct flow paths for the refrigerant fluid gas. One flow path collects all the compressed gas issuing from the indoor coil leads 19a and 19b, said leads 19a and 19b being generally indicated by the number 19, and transmits it through conduit 20, conduit 21, a receiver 22, conduit 23, conduit 24, an expansion valve 25 and into leads 26 of coil 11. This, of course, is the direction of flow for the heating cycle wherein coil 10 acts as the condenser. The second flow path, used for the coiling cycle, includes conduit 27 which collects liquid from leads 26 and transmits it through conduits 21, receiver 22, conduit 23, conduit 28, an expansion valve 29 and then into coil leads 19a. Each of the flow paths, it will be noted, contains check valve means 30, 31 and 32, which provides unidirectional flow from leads 19a, 19b and 26, respectively. Therefore, all gas passing from the leads of one coil toward the other coil must pass into conduit 21 and through receiver 22; none can be short-circuited through the opposite of conduits 20 and 27.

Details of an exemplary coil 10 connection are shown in FIG. 2. Certain coil leads 19a are connected to a manifold distributor 33 having an intake opening connected to the discharge end of a thermostatic expansion valve 29 and a discharge opening connected to a biased closed check valve 30, such as a Chatleff check valve. Coil leads 19b are joined by a divided conduit 34 having a central discharge line with a check valve 31 therein, conduit 34 being interconnected with conduit 20 at a T-juncture and said conduit 20 being connected to the discharge end of valve 30. Check valve 31 is preferably of a biased closed construction, such as a Mueller single directional check valve. The above named valves and distributor are well known devices commonly used in other directional flow control systems, and inasmuch as thermostatic expansion valves are commonly used in the field of air conditioning, a further description of their structural details or operation is though to be unnecessary.

Outdoor coil 11 is connected to conduits 24 and 27 by apparatus similar to that utilized for coil 10. However, since all the leads 26 of coil 11 are used for both the heating and cooling cycles, no apparatus is separately provided to transmit gas from only certain coils, as indicated above for indoor coil 10. Referring then to FIG. 1, it will be noticed that each of leads 26 connects with a manifold-distributor 35 having an intake connection to thermostatic expansion valve 25 and a discharge connection to Chatleff check valve 32, said check valve allowing gas discharge into conduit 27 but inhibiting a reverse flow.

With the above described apparatus, and assuming the refrigerant flow rate through compressor 12 remains substantially uniform for both cycles of operation, the flow rate through coil 10 will be increased during the cooling cycle since fewer than all of its coil leads 19 are then being utilized. Accordingly, the compressor should be selected for its maximum output rate to operate the apparatus in its most efficient heating cycle. Then, because a smaller heat exchanger surface area is needed for the indoor coil to operate the apparatus in the cooling cycle, fewer coil leads 19 are employed during the cooling cycle operation. The use of fewer coil leads will necessarily mean that the flow rate through coil 10 will be increased, and with proper selection of the number of coil leads 19 which are used during the cooling cycle, we may effectively operate a reverse cycle system with the proper heat exchanger surface areas for both heating and cooling cycles. Moreover, since the direction of fluid flow along the two flow paths is controlled by the check valves 30, 31 and 32 and the direction of applied compressor discharge, no independent shut-off valves need be supervised, operated or controlled to effectuate a change in the operating cycle.

While a preferred embodiment of this invention has been shown and described, it is to be understood that various changes in the kinds of valve structures, distributors and connections therefor may be made without departing from the spirit of the invention or the scope of the attached claims, and each of such changes is contemplated.

Having thus described my invention, what I claim and desire to secure by Letters Patent is:

1. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections; means for selectively connecting said discharge and suction connections to said first and second manifold lines respectively during the heating cycle and to said second and first manifold lines respectively during the cooling cycle; a first fluid transmitting means for collecting gas from said first leads and passing said gas to said second leads including first check valve means and means for expanding the gas passing therethrough; and a second fluid transmitting means for collecting gas from said second leads and passing said gas to fewer than all of said first leads including a second check valve means and means for expanding the gas passing therethrough.

2. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections; means for selectively connecting said discharge and suction connections to said first and second manifold lines respectively during the heating cycle and to said second and first manifold lines respectively during the cooling cycle; first conduit means for collecting gas from certain of said first leads, a first check valve in said first conduit means allowing a fluid passage from said certain first leads, second conduit means for collecting gas from other of said first leads, a second check valve in said second conduit means allowing fluid passage from said other first leads, said first and second conduits being joined at a T-juncture; a third conduit means for collecting gas from said second leads, a third check valve in said third conduit means allowing fluid passage from said second leads; fourth conduit means for collecting gas from said first, second and third conduits and transmitting said gas to said certain first leads and to said second leads, and means in said fourth conduit for expanding the gas being transferred from said third conduit to said certain first leads or from said first and second conduits to said second leads; whereby the number of said certain first leads, said other first leads and said second leads provide a controlled rate of fluid circulation suitable for efficient operation during both heating and cooling cycles.

3. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections; means for selectively connecting said discharge and suction connections to said first and second manifold lines respectively during the heating cycle and to said second and first manifold lines respectively during the cooling cycle; first conduit means for collecting gas from certain of said first leads, a first check valve in said first conduit means allowing fluid passage from said certain first leads, second conduit means for collecting gas from other of said first leads, a second check valve in said second conduit means allowing fluid passage from said other first leads, said first and second conduits being joined at a T-juncture; a third conduit means for collecting gas from said second leads, a third check valve in said third conduit means allowing fluid passage from said second leads; a receiver; conduit means interconnecting said receiver with said first, second and third conduits; conduit means interconnecting said receiver with said certain first leads and said second leads; and means disposed in said last named conduit means for expanding the gas being transferred from said receiver into either said certain first leads or said second leads; whereby the number of said certain first leads, said other first leads and said second leads provide a controlled rate of fluid circulation suitable for efficient operation during both heating and cooling cycles.

4. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections, means for selectively connecting said discharge and suction connections to said first and second manifold lines respectively during the heating cycle and to said second and first manifold lines respectively during the cooling cycle; a first manifold-distributor for collecting and disseminating gas from certain but less than all of said first leads, a second manifold-distributor for collecting and disseminating gas from said second leads, a first conduit interconnecting said first and second manifold-distributors including means for expanding gases passing therethrough; a second conduit interconnecting said first manifold-distributor and the other of said first leads with said first conduit, check valve means being disposed in said second conduit for preventing gas flow into said first leads; a third conduit interconnecting said second manifold distributor with said first conduit, check valve means being disposed in said third conduit for preventing gas flow into said second leads; whereby the number of said certain first leads, said other first leads and said second leads provide a controlled rate of fluid circulation suitable for efficient operation during both heating and cooling cycles.

5. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections, means for selectively connecting said discharge and suction connections to said first and second manifold lines respectively during the heating cycle and to said second and first manifold lines respectively during the cooling cycle; a first manifold-distributor for collecting and disseminating gas from certain but less than all of said first leads, a second manifold-distributor for collecting and disseminating gas from said second leads, a first conduit interconnecting said first and second manifold-distributors including means for expanding gases passing therethrough; a receiver, conduit means for interconnecting said receiver with said first conduit, conduit means for interconnecting said receiver with said first and second manifold-distributors and the other of said first leads, and check valve means obstructing fluid flow through said last named conduit means into either of said manifold-distributors or said other first leads; whereby the number of said certain first leads, said other first leads and said second leads provide controlled rate of fluid circulation suitable for efficient operation during both heating and cooling cycles.

6. In a reverse cycle system, apparatus for either heating or cooling an enclosure and comprising in combination: a first bank of indoor coils having first leads and being connected to a first manifold line; a second bank of outdoor coils having second leads and being connected to a second manifold line; a compressor having suction and discharge connections, means for selectively connecting said discharge and suction connections to said first and second manifold lines respectively during the heating cycle and to said second and first manifold lines respectively during the cooling cycle; a first manifold distributor for collecting and disseminating gas from certain but less than all of said first leads, a second manifold-distributor for collecting and disseminating gas from said second leads, said first and second distributors each having an inlet opening and an outlet opening, a first expansion valve connected to the inlet opening of said first distributor and a second expansion valve connected to the inlet of said second distributor, a first conduit for interconnecting said first and second expansion valves, a receiver, a second conduit for interconnecting said receiver with said first conduit, conduit means for interconnecting said receiver with the outlet openings of said first and second distributors and the other of said first leads, and check valves disposed in said last named conduit means allowing fluid flow from said distributors and other first leads into said receiver but preventing fluid back flow into either of said distributors or said other first leads from said receiver or one of said distributors or other first leads; whereby the number of said certain first leads, said other first leads and said second leads provide a controlled rate of fluid circulation suitable for efficient operation during both heating and cooling cycles.

References Cited in the file of this patent

UNITED STATES PATENTS

| | | |
|---|---|---|
| 2,148,415 | Labberton | Feb. 21, 1939 |
| 2,715,317 | Rhodes | Aug. 16, 1955 |